(12) United States Patent
Hlava et al.

(10) Patent No.: US 6,256,704 B1
(45) Date of Patent: Jul. 3, 2001

(54) TASK MANAGEMENT FOR DATA ACCESSES TO MULTIPLE LOGICAL PARTITIONS ON PHYSICAL DISK DRIVES IN COMPUTER SYSTEMS

(75) Inventors: Alan Hlava; Scott David Mastie, both of Longmont; Arthur Ray Roberts, Boulder, all of CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/122,828

(22) Filed: Sep. 16, 1993

(51) Int. Cl.[7] .................................................. G06F 13/20
(52) U.S. Cl. ...................................... 711/112; 710/5
(58) Field of Search ............................ 395/400, 425, 395/725, 600, 650, 439, 826; 711/112, 5

(56) References Cited

U.S. PATENT DOCUMENTS

| | | | |
|---|---|---|---|
| 4,371,929 | * 2/1983 | Brann et al. | 364/200 |
| 4,454,595 | * 6/1984 | Cage | 364/900 |
| 4,722,051 | * 1/1988 | Chattopadhya | 364/200 |
| 4,905,141 | * 2/1990 | Brenza | 364/200 |
| 5,220,653 | * 6/1993 | Miro | 395/275 |

OTHER PUBLICATIONS

B.R. Howarth, "A Review of Disk Scheduling Policies", The Australian Computer Journal, V 14, N 4, Nov. 1982, pp. 150–154.*

* cited by examiner

Primary Examiner—Kevin L. Ellis
(74) Attorney, Agent, or Firm—Wm. B. Dick; Robert M. Sullivan

(57) ABSTRACT

Disclosed is a method (and apparatus) for optimizing disk access operations which span multiple logical disk partitions and multiple disk drives. The disclosed method makes optimum use of concurrency in the software without causing poor performance due to contention for seeks in a disk drive.

20 Claims, 10 Drawing Sheets

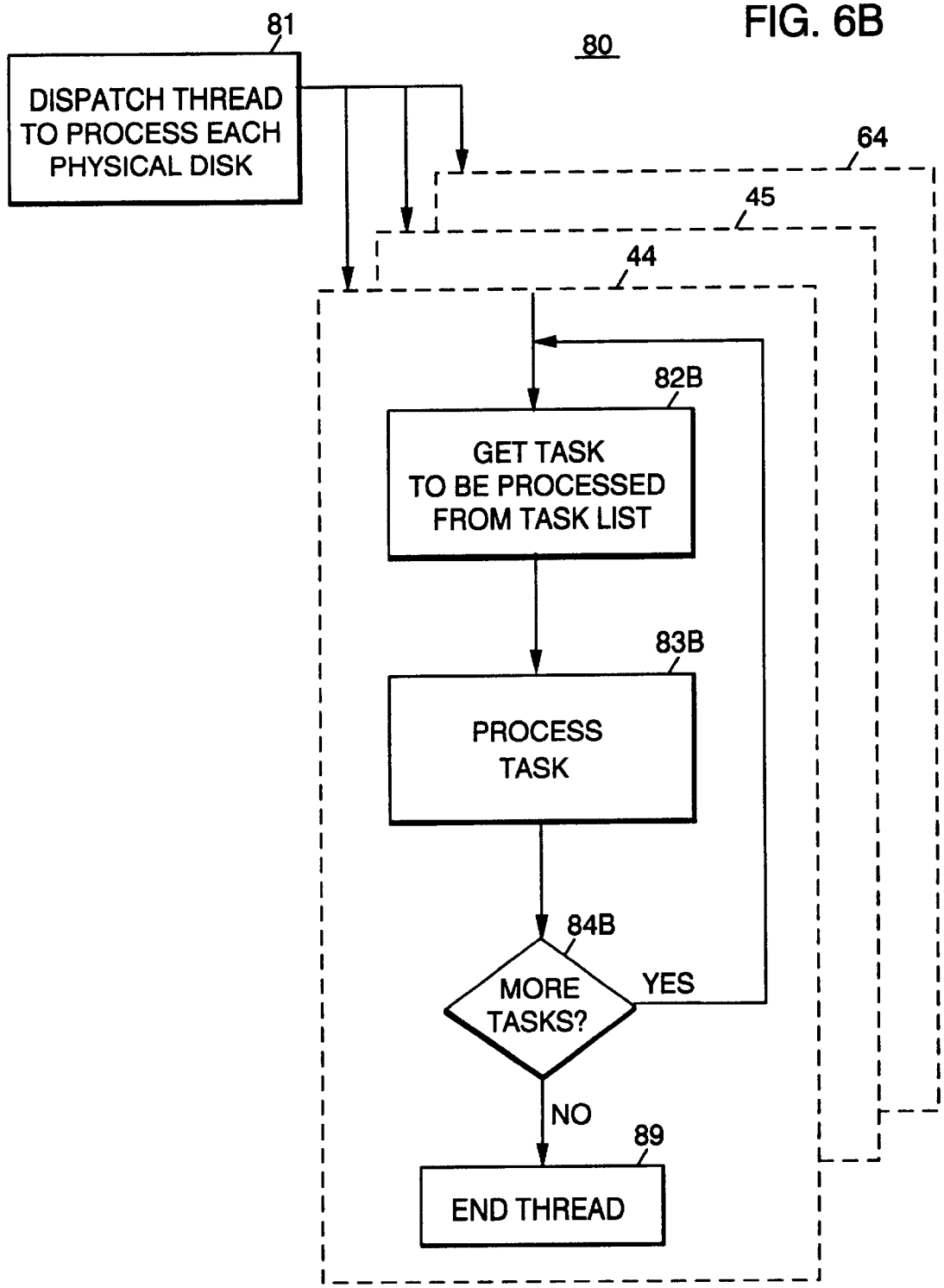

FIG. 7A

MASTER TASK LIST

OP1  C: FILE1.TP1
OP1  C: FILE2.TP1
OP2  C: FILE3.TP1
OP1  D: FILE4.TP1
OP3  E: FILE5.TP1
OP2  G: FILE6.TP1
OP3  H: FILE7.TP1
OP1  F: FILE1.TP2
OP2  F: FILE2.TP2
OP2  E: FILE3.TP2
OP1  C: FILE4.TP2
OP2  D: FILE1.TP3
OP1  D: FILE8.TP1
OP3  D: FILE9.TP1

FIG. 7B

PDD TASK LISTS

PHYSICAL DISK 44

OP1  C: FILE1.TP1
OP1  C: FILE2.TP1
OP2  C: FILE3.TP1
OP1  C: FILE4.TP2
OP1  D: FILE4.TP1
OP2  D: FILE1.TP3
OP1  D: FILE8.TP1
OP3  D: FILE9.TP1

PHYSICAL DISK 45

OP3  E: FILE5.TP1
OP2  E: FILE3.TP2

PHYSICAL DISK 64

OP2  G: FILE6.TP1
OP3  H: FILE7.TP1
OP1  F: FILE1.TP2
OP2  F: FILE2.TP2

TASK MANAGEMENT FOR DATA ACCESSES TO MULTIPLE LOGICAL PARTITIONS ON PHYSICAL DISK DRIVES IN COMPUTER SYSTEMS

FIELD OF THE INVENTION

The present invention relates to the field of managing the processing of quantities of data spanning logical disk partitions in computer systems. More particularly, the present invention relates to methods for optimizing data access across multiple logical partitions spread across one or more physical disk drives, and particularly for the transfer of large quantities of data. It is noted that the term "physical disk" is used in relation to the present invention to indicate any permanent storage device for data where the device includes an access mechanism; e.g., a disk drive head arm carrying one or more read/write heads that are capable of reading/writing one discrete area of the disk medium at any one time, and require time to move from one area of the medium to another.

DESCRIPTION OF THE PRIOR ART

A crucial characteristic of any file system associated with an operating system for a computer is how well the file system performs. Conventionally, all application file I/O is accomplished by, and through, the operating system file system. By way of example, in the IBM Operating System/2[1]* (OS/2*), which is a multi-tasking operating system where multiple programs execute concurrently, application programs access the file system through the application programming interface. When considering the speed of a computer, file operations are slow. For example, reading a sector from a disk is about 100 to 200 times slower than copying the same amount of data from the computer memory. Disk access time may be 40 milliseconds (ms) or more, depending upon sector location, the position of the read/write head, and the disk speed. Compare this with a memory-memory move of 512 bytes of data, which requires about 0.4 ms on an 8 MHz machine. Now consider the time to move large quantities of data to, or from, a hard file.

[1]. * indicates a trademark of International Business Machines Corporation.

Large hard files, or hard disks, are usually supported as multiple "logical" devices. Disk partitioning is a very simple concept which is implemented fundamentally in the disk device driver. Each physical disk is divided into one or more areas called partitions or logical partitions. Each of the disk partitions is treated as a separate and distinct volume. In this connection, the file system, associated with the operating system (in our example, OS/2*), refers to each partition with a different drive identifier as if it were a different disk drive.

Much has been written and accomplished concerning methods of optimizing disk reading and writing at the file or sector level. These activities usually relate to readahead, data caching, data blocking, and the like. Typically, these activities do not assume any application type that is requesting the disk accesses. However, it is considered that these optimization are low-level and do not take into account operations which include reading to, and writing from, multiple logical partitions and physical disks. Additionally, these optimization are general purpose and are not tuned for any specific type of data access.

For example, with an operating system such as OS/2*, there is nothing which optimize applications where large quantities of data, spanning multiple disks and logical partitions, are to be transferred. These include such applications as disk backup and restore. These applications should take advantage of concurrency provided by the operating system and disk subsystems without using concurrency in a way which hinders overall performance. Generally, they do not. There has been limited prior activity in attempting to optimize on a fundamental level the transfer of large quantities of data when using partitioned drives. These attempts generally used one of two approaches: (1) Serialize the transfer tasks, or (2) perform all transfer tasks in parallel. The former operation is only optimum if all partitions are on a single drive. The latter task handling approach optimize for one partition on each of several drives, but bogs down when several partitions are located on each drive and concurrent transfer of data from multiple partitions on one drive is attempted. With requests for work which span multiple logical drives, for example, to backup a storage group (files in one or more partitions), it is highly desirable for performance efficiency to allow for parallel processing using a multi-threaded approach to handling the requests.

This utilizes parallelism to achieve the advantage of all of the available machine cycles. [NOTE: In a multitasking system, programs are associated with dispatchable units. Dispatchable units identify the programs that the operating system may run concurrently. A thread identifies a dispatchable unit of work or work element (a program runs within a thread).]

Multiple threads, one per physical hard file, will clearly outperform a single thread reading from multiple physical media serially. However, a multi-threaded approach can actually result in poorer performance than a single-threaded model if multiple threads end up spawned against a single physical hard file; e.g., disk (with multiple partitions). Each thread is I/O intensive and has the task of reading all the data from a logical partition. In a multi-tasking operating system, such as OS/2*, the multiple threads spawned contend for the read/write head of the hard file, causing thrashing (inefficient seeks) and degrading performance. In the OS/2* operating system, since time slicing is employed for multi-tasking, processor time is also wasted by this thrashing.

SUMMARY OF THE INVENTION

In view of the above, it is a principal object of the present invention to optimize concurrent data transfer tasks in a multi-tasking operating system environment (for example OS/2*) when large quantities of data are required to be transferred from multiple physical disk drives, at least one of which includes multiple logical partitions. This is accomplished, in accordance with the invention, by grouping large data access tasks against partitions on the physical disk that will be read from or written onto, and by executing threads serially, in accordance with a task list for the disk, while executing or dispatching parallel or concurrent thread execution on other disks. In this manner, concurrent tasks will not interfere with one another by contending for a disk read/write head, and optimum concurrency of tasks may be achieved.

Another object of the present invention is to maximize the transfer efficiency of large quantities of data to/from secondary memory storage in the environment heretofore described. This is accomplished by performing a partition analysis before dispatching program threads to work concurrent tasks. The partition analysis maps logical partitions to physical disks, and then creates a task list for each physical disk. A concurrent execution routine (referred to as a "thread of execution" or simply a "thread") is then dispatched to process the task list for each physical disk.

The result of the partition analysis and consequent mapping into task lists for each physical disk and concurrent task dispatch causes only one task operation on each physical disk at any given moment. In this manner, optimum use of concurrency without causing disk head contention, which tends to slow down overall performance, is achieved. It should be noted that the present invention, while not including any low-level general purpose disk optimization at the read/write head or sector level, does operate in a manner to take advantage of schemes which may be available; e.g., read ahead, data caching, blocking, etc.

Other objects and a more complete understanding of the invention may be had by referring to the following description taken in conjunction with the accompanying drawings.

BRIEF DESCRIPTION OF THE DRAWINGS

FIGS. 6A and 6B are flowcharts of alternative embodiments for concurrent processing of data access tasks in PDD task lists for multiple physical disk drives as called for in FIG. 3.

FIG. 7A is an example of a master task list for accesses to multiple partitions in multiple physical disks in the system.

FIG. 7B illustrates PDD task lists for each physical disk as factored or dividing out from the master task list in FIG. 3B in accordance with the process of FIG. 5.

DETAILED DESCRIPTION OF THE PREFERRED EMBODIMENT

In accordance with the invention, a method is shown for optimizing a data transfer task in a computer system wherein (1) the computer system includes multiple physical disk drives, (2) one or more of the physical disks has a plurality of logical partitions, and (3) the data transfer task requires access to large quantities of data located across multiple partitions.

Figure 1:
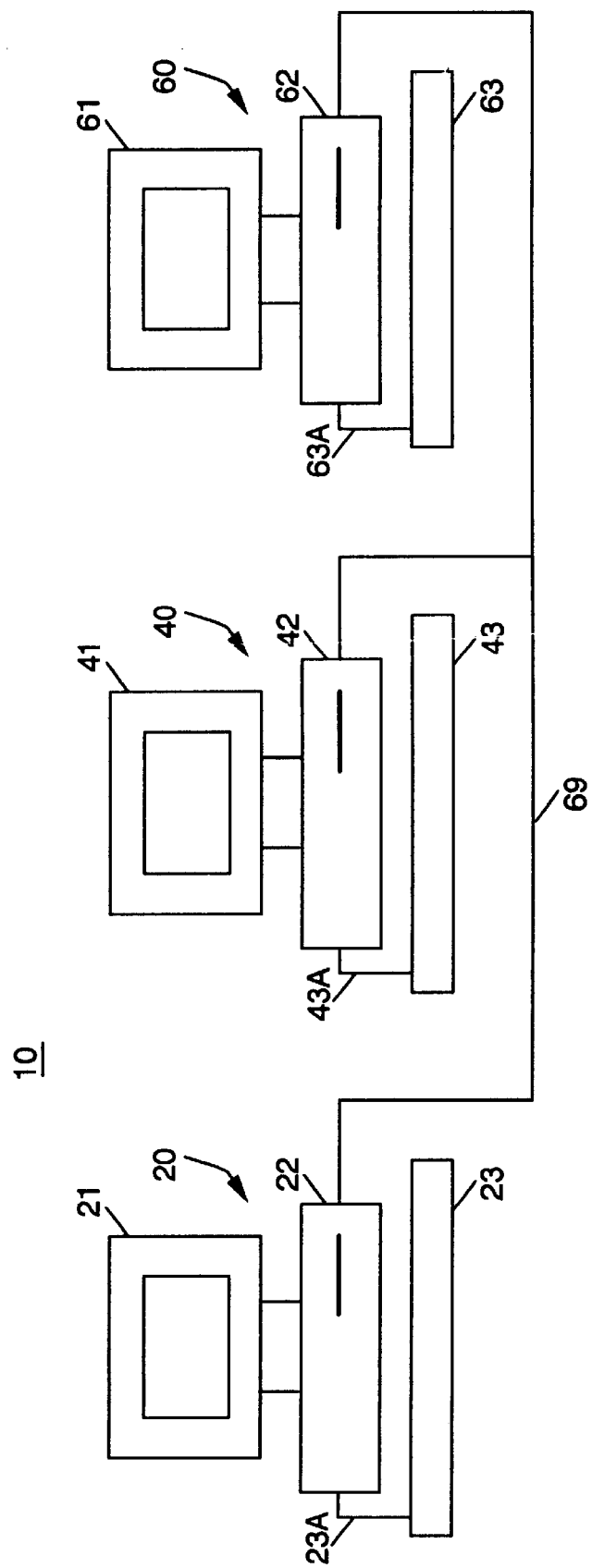
FIG. 1 is a diagrammatic representation of a network of client/server computing systems which is benefitted by the multiple thread management of tasks in accordance with the present invention.

Referring now to the drawings, and especially FIG. 1 thereof, shown therein is a network 10 comprising a plurality of computer systems 20, 40 and 60, respectively, which are connected together in a conventional manner by cable 69 for communication therebetween in a Local Area Network (LAN). Each of the computer systems 20, 40 and 60 may include monitors 21, 41 and 61, respectively. As shown, each of the monitors 21, 41 and 61 is mounted on a system unit 22, 42, 62 each of which, as is conventional, may contain a CPU and primary memory (semi-conductor memory chips arranged as random access memory) as well as secondary memory, such as physical disk drives (e.g., hard files). The system units each contain I/O ports for input/output connection. As illustrated in FIG. 1, each of the system units 22, 42, 62 may be connected to an I/O port for keyed manual inputs from respective keyboards 23, 43 and 63 as by connecting cable 23a, 43a and 63a, respectively. Computer system 20 is assumed to be the server, although any of the client systems 40, 60 may serve from time to time in that capacity. The operating system is preferably multi-user, and multi-tasking, such as Operating System/2* sold by International Business Machines Corporation. The computer systems 20, 40 and 60 operate as a network system with the computer systems interconnected in any convenient communication network. If Operating System/2* is employed as the operating system of choice, then it is preferred that the client/servers be Micro-Channel* computers, such as the Personal System/2* line of computers (Mod. 50 and up) sold by International Business Machines Corporation. However, as will become apparent hereinafter, any compatible computer system, operating system, network interconnection, as well as network application program, may be employed.

Figure 2:
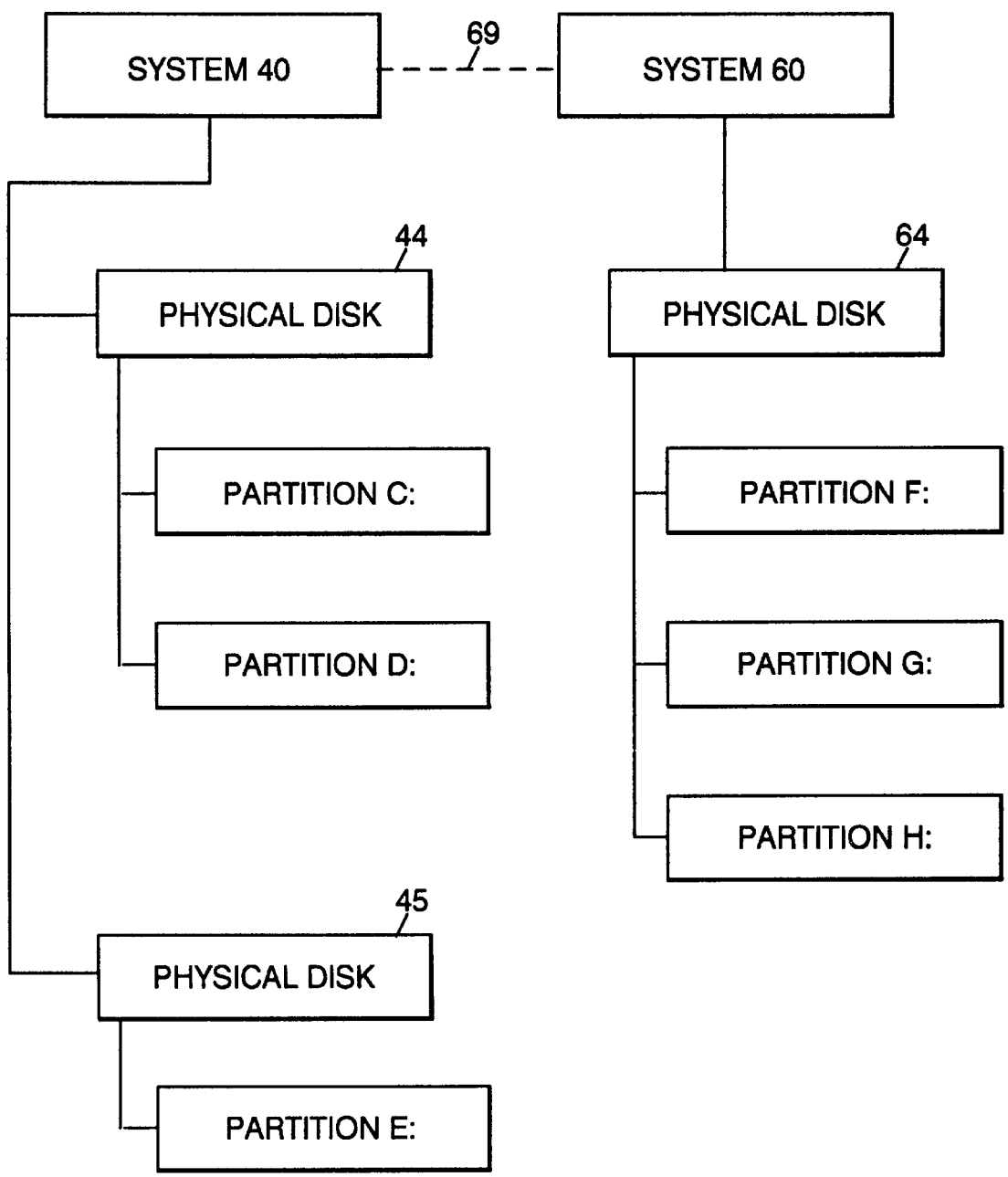
FIG. 2 is a schematic representation of a portion of the network of client/server computing systems shown in FIG. 1, and illustrating exemplary secondary memory systems which may favorably employ the task management scheme of the present invention.

To further understand the environment of the present invention, reference is now made to FIG. 2. Using the client computer systems 40 and 60 as an example, system 40 includes a separate disk subsystem comprising physical disk drives 44 and 45, disk drive 44 containing two logical partitions C: and D:. This is a typical physical disk configuration that may be employed, for example, to place the operating system and the user's files in separate logical partitions. Disk 45 of the subsystem illustrates the simplest configuration wherein the entire disk is composed of a single partition E:. The disk subsystem of computer system 60 includes a single physical disk 64 with more complex logical partitions, F:, G: and H:. As will become evident from the following discussion, the separate disk subsystems may be involved in coordinating multiple tasks to access files in multiple partitions in the interconnected subsystems. For example, assume that one or more programs operating in the system have caused the server 20 to build a master task list, as shown in FIG. 7A. In this illustrative form for tasks in the example master task list, "OP1," "OP2" and "OP3" are representative of different access operations (for example, read, write, refresh, backup, transfer, copy, verify, etc.). The partitions "C:" through "H:" in the task list correspond to the partitions in physical disks 44, 45 and 64. The various "FILEx.TPx" are illustrative of filename.filetype nomenclature used with files in personal computers. Accordingly, the first task list in the master task list equates to perform access operation 1, "OP1", on file "FILE1.TP1" in the "C:" partition.

In the environment depicted above, and by way of example only, the task of backing up the full set of partitions C:, D:, E:, F:, G: and H: will be considered. In other words, the master task list contains tasks, BACKUP C:*, BACKUP D:*, . . . and BACKUP H:*. Further, assume that the back up of those partitions is to be to the server 20. In order to better understand the optimum method of the present invention, two extreme ways that this task can be sequenced will first be discussed.

The first prior art method of backing up the full set of partitions is to do so sequentially. By this method, a single thread would first back up the data in partition C:, then back up the data in partition D:, then back up the data in partition E:, etc. This approach is not optimum except in the instance where all the partitions reside on a single physical disk. In all other configurations, it fails to take full advantage of concurrency to speed up the task. For instance, in the environment described with regard to FIG. 2, physical disk 45 associated with system 40, and physical disk 64 associated with computer system 60, remain idle the entire time that partitions C: and D: are being backed up.

In the opposite extreme, a separate thread could be started for each partition that is to be backed up. If this occurred, six concurrent threads would be started simultaneously, one backing up each of the partitions separately but concurrently. This approach is not optimum except in the instance where each physical disk contains a single logical partition. In all other configurations, separate threads, which are running simultaneously to access each logical partition, create disk contention which degrades the overall performance. In our example, the individual threads backing up partition C: and partition D: concurrently will contend for control of the read/write head arm actuator in disk 44. This would cause the access mechanism for physical disk 44 to repeatedly seek read/write heads back and forth between partitions C: & D: as the two threads will attempt to execute simultaneously. This contention takes extra time, and additionally undermines any low-level optimization, such as aforementioned read-ahead, cache, etc., that may be present and attempted. The contention on physical disk 64 is even worse because there are three threads contending for the disk access mechanism. Access task optimization is accomplished, in accordance with one preferred embodiment of the invention, by the logical operations or process depicted in FIGS. 3–6, inclusive. The method is started at block 50 in FIG. 3 by a request to process the master task list in FIG. 7A. Such a request passes program control to the logical operations or process in FIG. 3 for control of accesses to multiple files in multiple partitions across the interconnected subsystems.

Figure 3:
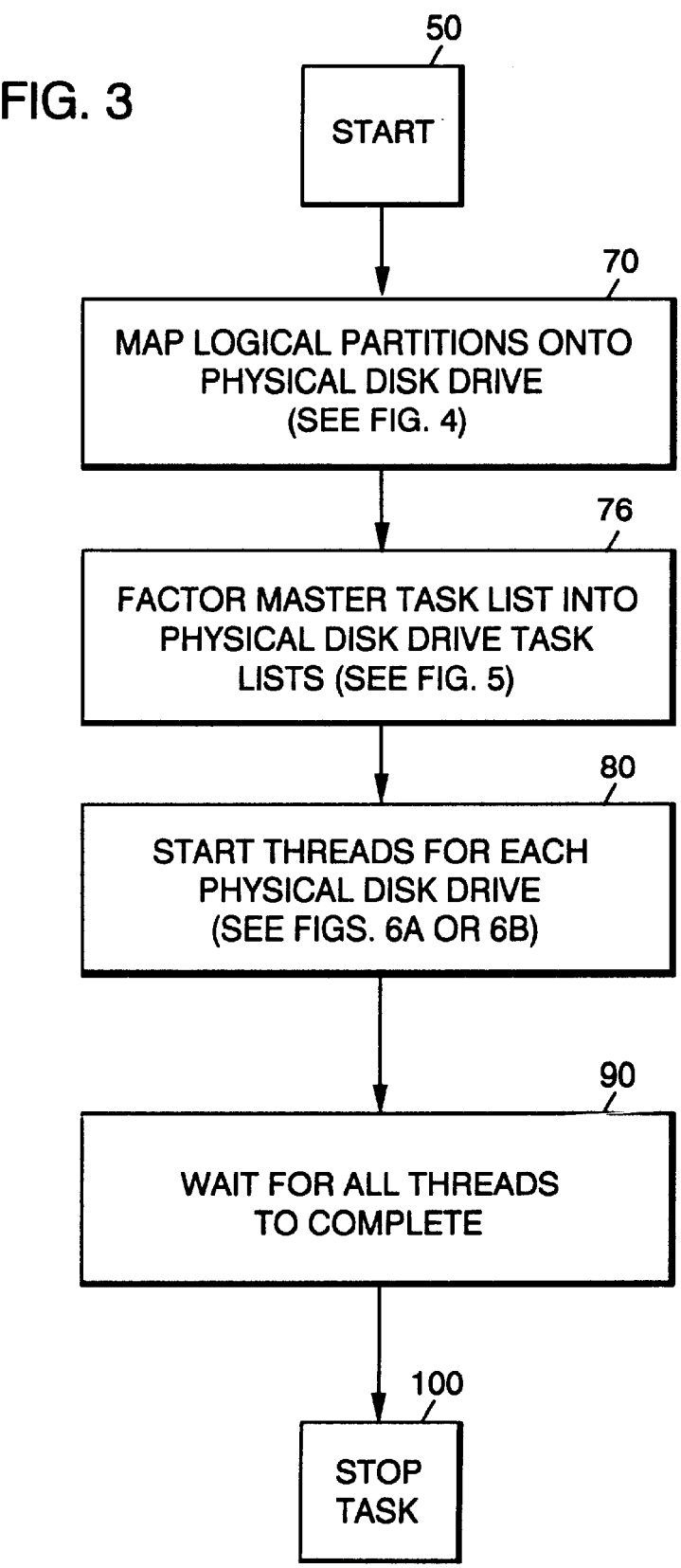
FIG. 3 is a diagrammatic representation of the operations employed for high-level optimization of accessing multiple files in computer networks employing systems of the illustrated type.

The first step of the process in FIG. 3 is to map the logical partitions in the system according to the physical disk drives, as shown in block 70. In other words, the server builds a partition map that identifies the partitions on each physical disk. The operation of the mapping process is described in more detail hereinafter by reference to FIG. 4. After mapping operation 70, step 76 of the process factors (separator or divider out) tasks on the master task list into a task list for each physical disk drive. The details of the process in operation 76 are shown in FIG. 6. The result of the factoring or dividing out operation 76 on an exemplary master task list in FIG. 7A are the three task lists (one per physical disk) shown in FIG. 7B.

Once the task lists for the physical disks are built, a separate thread is started (operation 80 in FIG. 3) to operate on each physical disk that has a task list factored or divided out from the master task list. Each of these threads then processes the tasks, as queued in the task list by partitions, on the physical disk for which the thread was started. The concurrent threads process of operation 80 is shown in detail in FIG. 5. Completion of the multiple access process now waits for all the threads to complete, as depicted in block 90 in FIG. 3. When that is completed, the process started at block 50 is finished, as shown at block 100, and program flow returns to the operating system or main program.

Figure 4:
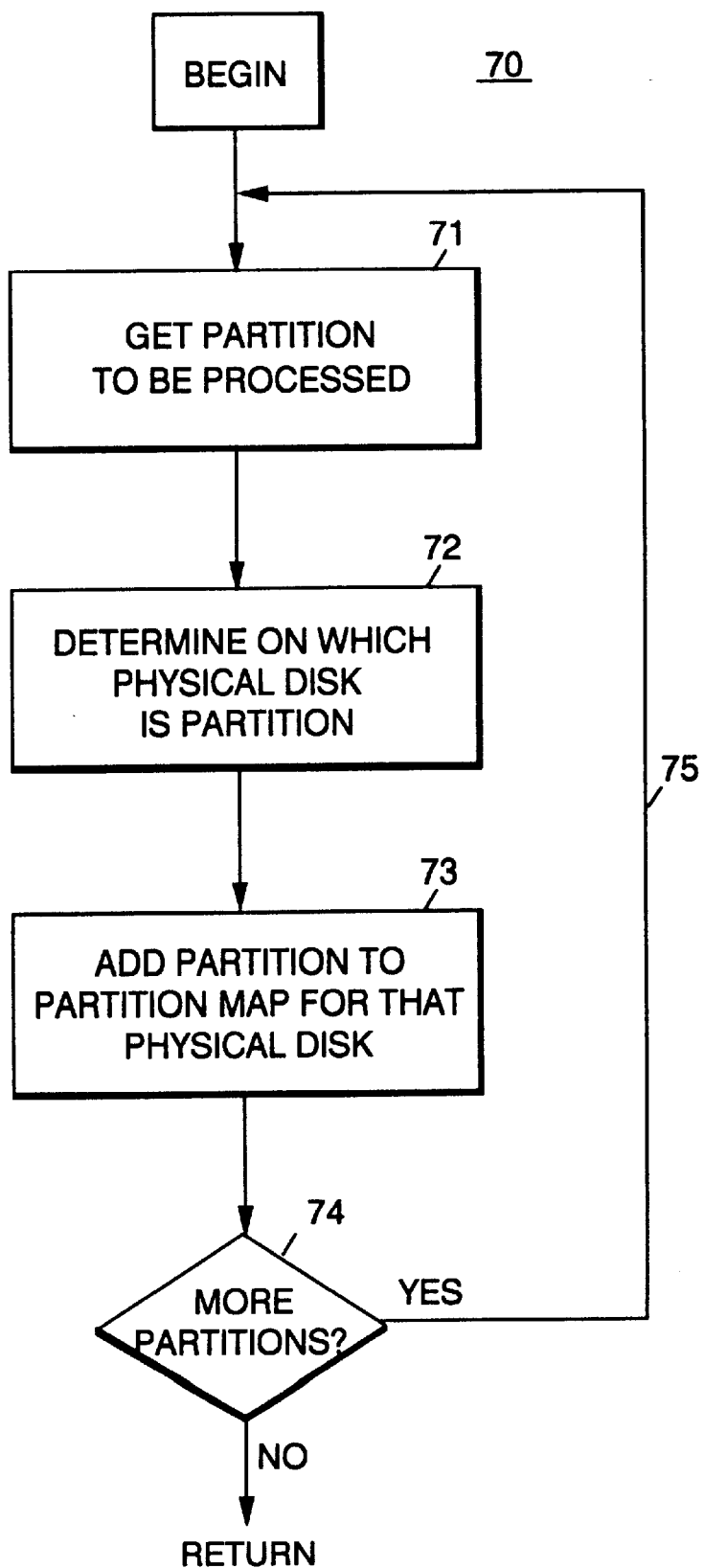
FIG. 4 is a flowchart showing operations for mapping logical partitions to physical disk drives as required in FIG. 3.

The routine in FIG. 4 is employed to map the logical partitions named in the original request to physical disk drives, as depicted in block 70, FIG. 3. The logical operation or process in FIG. 4 uses a program loop which examines the partition parameters associated with the tasks in the master task list to be processed, and determines on which physical disk the partition resides. To this end, the first processing step of loop 70 is shown at block 71. Operation 71 gets, or retrieves, the first partition parameter from the tasks in the set of partitions to be processed for the request. In the next step, operation 72 determines on which physical disk the partition resides. The manner in which this is accomplished is, of course, dependent upon the operating system and/or the disk architecture in use on that system. With an example OS/2* operating system and a Small Computer System Interface (SCSI) and a Micro Channel* architecture computer, the means for determining on which physical disk the partition is located is taught in much of the technical literature. An excellent book on the subject is, "*OS/2 Programmer's Guide*", by Ed Iacobucci and published by Osborne McGraw-Hill.

Partition definition as defined relative to a disk drive, may take a number of forms. The one described below is typical of an IBM AT* personal computer. Partitions of a disk drive are normally defined in a so-called "partition" block located on the physical disk drive. For example, an I.S.A. (Industry Standard Architecture) partition block is located at the first physical sector of the disks in physical disk drives 44, 45 and 64. Just by way of example, the partition block of physical disk 44 would consist of an Initial Program Load (IPL) segment or boot loader, partition C: and D: identifier segments and a boot segment. Each of the segments include a partition table containing appropriate identification information for the corresponding disk partition. A suitable disk partition table description may be found in International Publication No. WO 92/07319, published on Apr. 30, 1992.

After operation 72 determines on which disk drive the particular partition is located, operation 73 adds this information to the partition map for the identified physical disk (block 73). Next, as shown in block 74, the partitions in tasks on the master task list to be processed are checked to see if there are any more partitions. If there are, the routine loops back, as shown by line 75 to block 71, and the logical steps of the routine repeat. If not, the routine returns and the next process step, block 76 of FIG. 3, is initiated.

Figure 5:
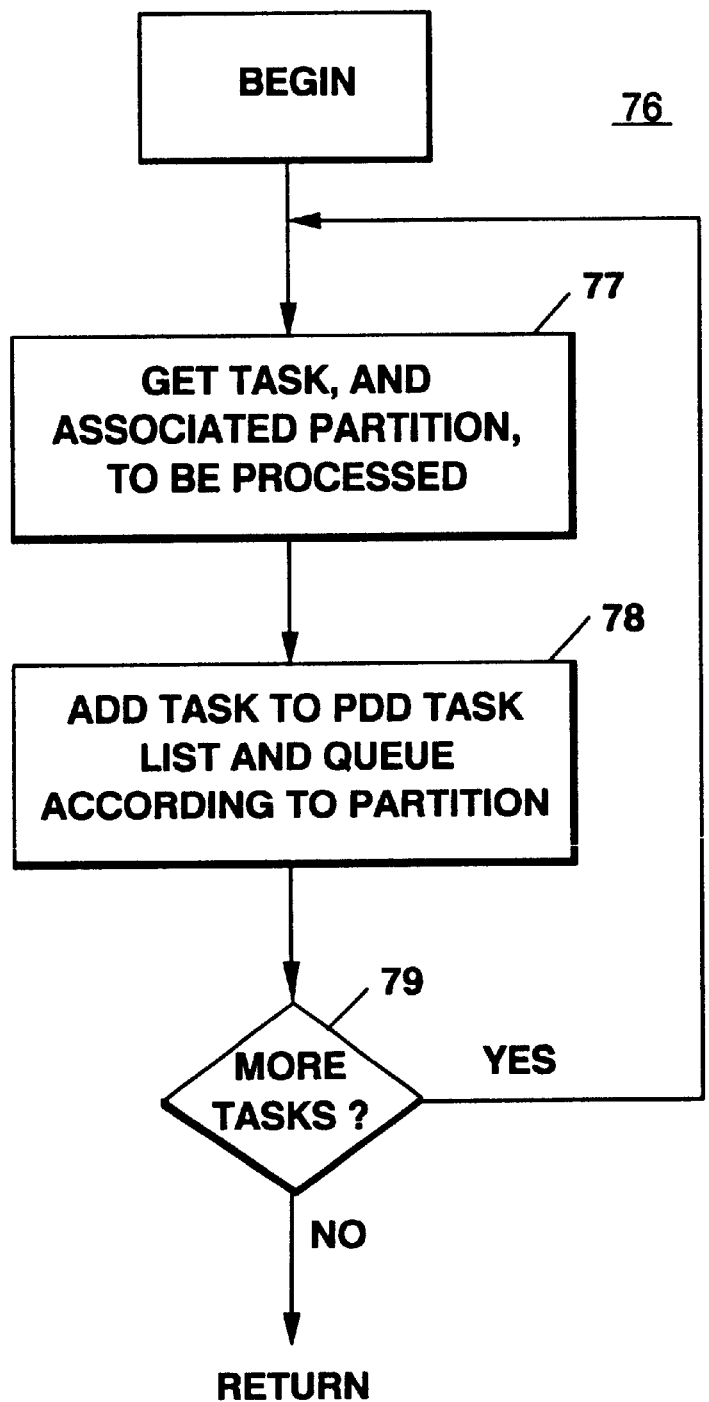
FIG. 5 is a flowchart of the operations employed in factoring a dividing out tasks from master task list to a Physical Disk Drive (PDD) task list as called for in FIG. 3.

In FIG. 5, the factoring process 76 (FIG. 3) begins at operation 77. Step 77 retrieves the task and the partition parameter associated with that task. Next, operation 78 then adds the task to the task list for the physical disk which contains the partition associated with the task. After each task is added to a physical disk task list, decision block 79 tests whether there are more access tasks in the master task list. If the answer is yes, the operation flows back to process step 77 to get the next access task in the master task list.

In another preferred embodiment of the invention, operation 78 also queues the access tasks by partition as each physical disk task list is built. In this embodiment, the process loop 76 (FIG. 5) reads all the tasks in the master task list, FIG. 7A, and factors the tasks into a partition-queued task list for each physical disk, as shown in FIG. 7B. When the last task has been read and added to a physical disk task list, decision block 79 causes the process flow to return to the control process in FIG. 3. The next operation in FIG. 3 is the starting of threads which is detailed in FIG. 6A.

Figure 6A:
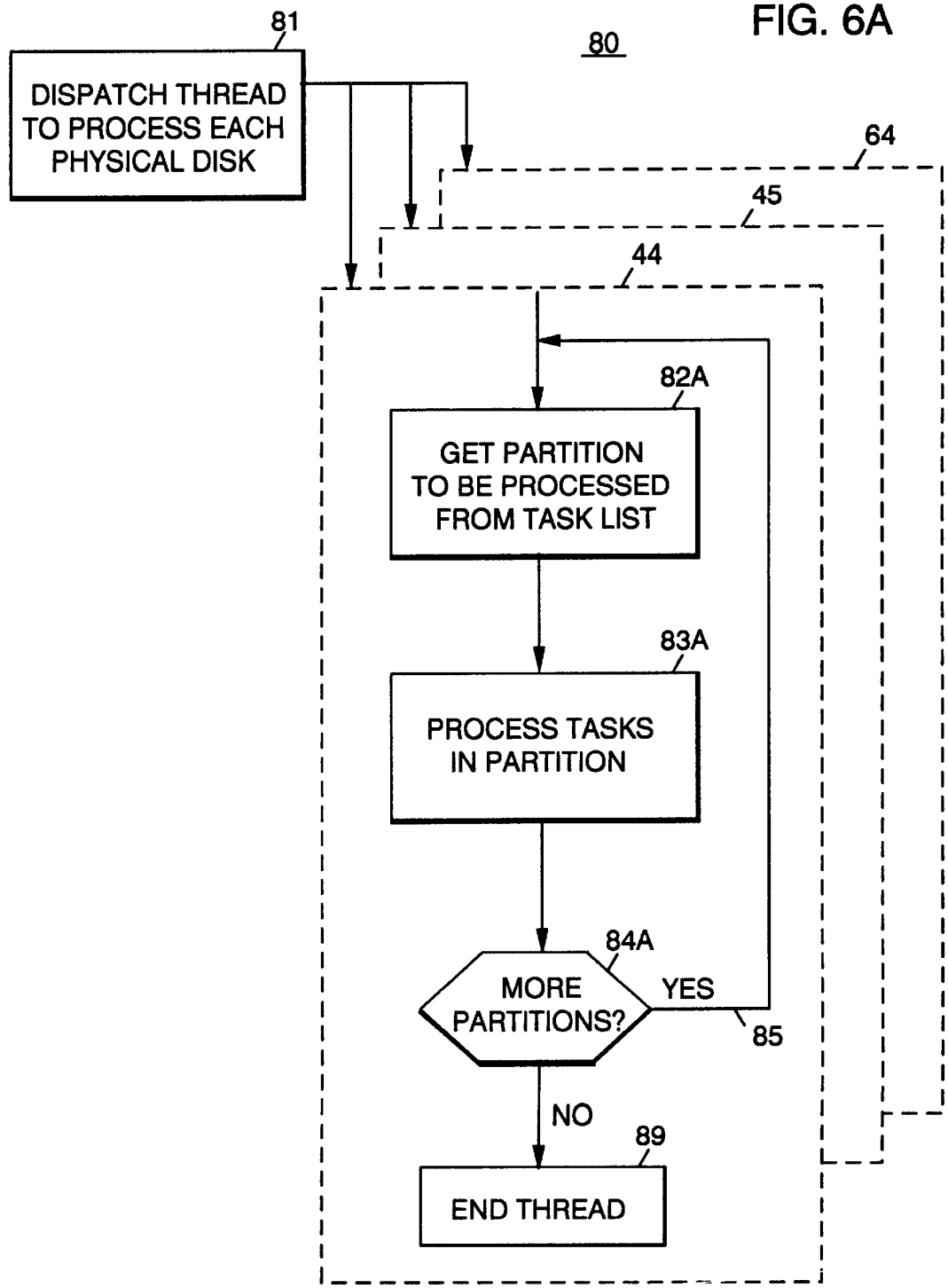

Referring now to FIG. 6A, the logic involved in dispatching threads and what each thread does is illustrated. In general, the logic to dispatch threads, and the loop which runs within each thread to perform the actual work on the partitions is shown. The operating system initiates the process to dispatch a thread to process each of the physical disks (block 81). In the example of FIG. 2, physical disks 44, 45 and 64 are shown in dotted lines in FIG. 5. The dispatching of threads to each of the physical disks is concurrent, each of them performing the same logic concurrently and using the task list for the individual physical disk.

The process in FIG. 6A will process tasks in the physical disk (PDD) task list whether or not the tasks have been queued by partition. Operation 82A gets from the PDD task list all tasks having the same partition parameter as the partition to be processed. Next, as shown in block 83A, all tasks in the task list for that partition are processed. When that processing is finished, operation 84A checks the task list for that drive to see if there are any more partitions requiring processing. In other words, are there any more partitions that this thread is to process? If so, as illustrated, the process loops back (line 85) to block 82A and the above logic is repeated. If there are no more partitions, this thread of execution (block 89) is ended.

In the alternative preferred embodiment where the tasks are queued by partition (FIG. 7B) in the physical disk task list, the process loop at each physical disk drive is somewhat simpler. Operation 81 in FIG. 6B dispatches a thread to each physical disk 44, 45 and 64. The first operation by the thread is to get, or retrieve, the first task from the task list (see block 82B). In operation 83B, the task is processed by the thread. Decision block 84B then tests whether there are more tasks in the physical disk task list. If the answer is yes, the process flows back to operation 82B to retrieve from the task list the next access task. Because the tasks in the physical disk task list have been queued by partition, the next task will be in the same partition, unless all tasks in that partition have be processed by the thread. Accordingly, in this embodiment where factoring also queues tasks by partition, the processing of tasks at the physical disk is simplified to processing the tasks one after the other in the task list. When all tasks in the physical disk task list have been processed, the answer to decision block 89 is no, and the thread dispatched to that physical disk drive ends.

Referring back to FIG. 3, the main thread (data transfer task initially dispatched) has been waiting to ascertain that all the other threads have ended execution (block 90). When all threads have been processed, the overall set of tasks in the master task list has been completely processed. This is accomplished without disk contention because concurrent threads have been dispatched to operate against different physical disks.

The FIG. 3 embodiment of the invention handles the master task list in a batch process mode of operation. In another preferred embodiment of the invention illustrated in FIGS. 8 and 9, tasks in the master task list are processed in a continuous, or dynamic, mode of operation rather than in a batch process mode. In this dynamic mode, once a thread is dispatched to a Physical Disk Drive (PDD), it does not end. Instead, the physical disk drive task list is updated continuously from the master task list and if a thread completes all tasks in the PDD task list, the thread waits for the next task to be loaded into the PDD task list. The master task list is factored, and tasks are transferred to PDD task lists independently of processing of task from the PDD task list by the thread.

Figure 8:
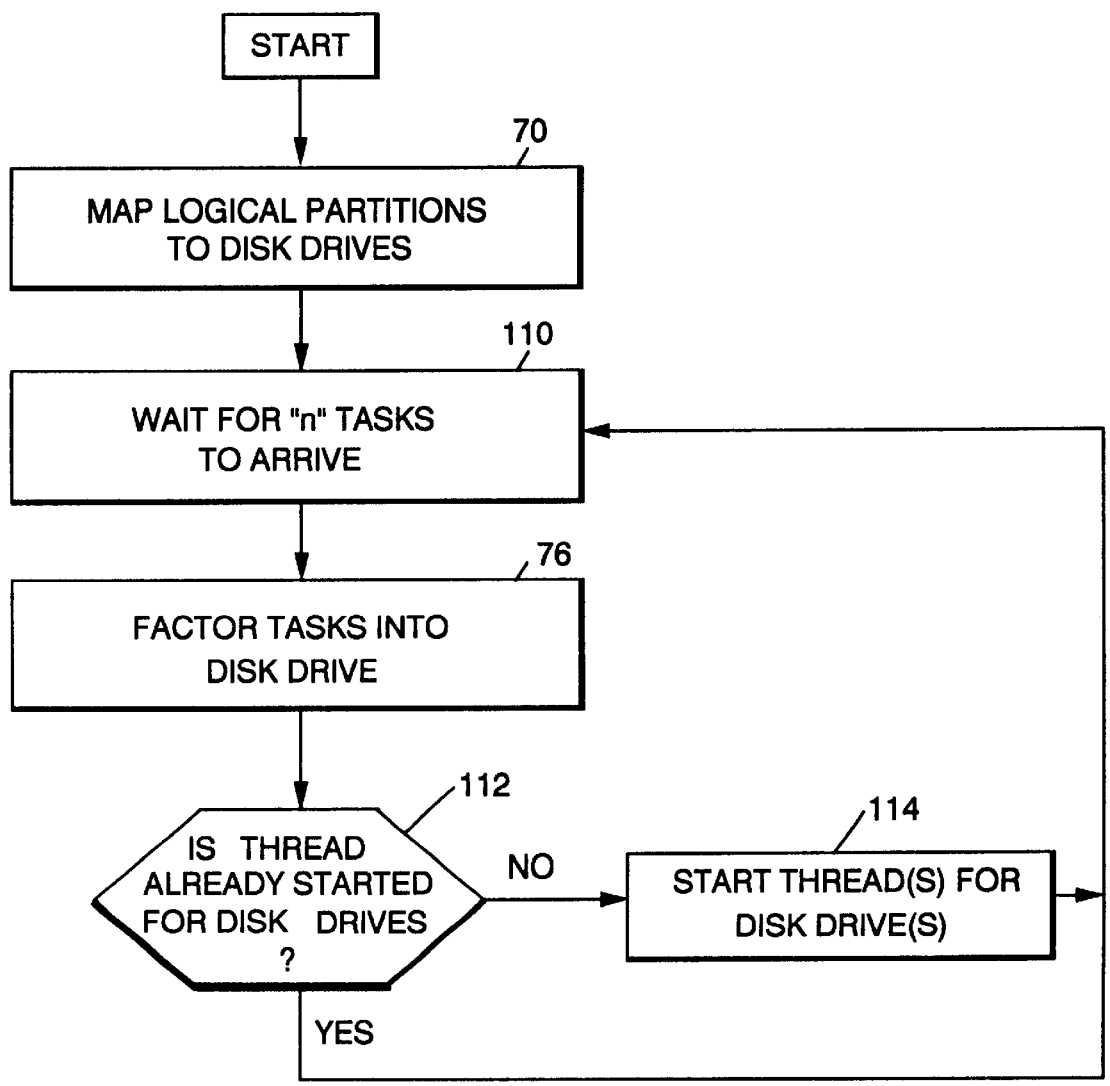
FIG. 8 illustrates an alternative embodiment of the invention where PDD task lists are updated while being processed by threads.
Figure 9:
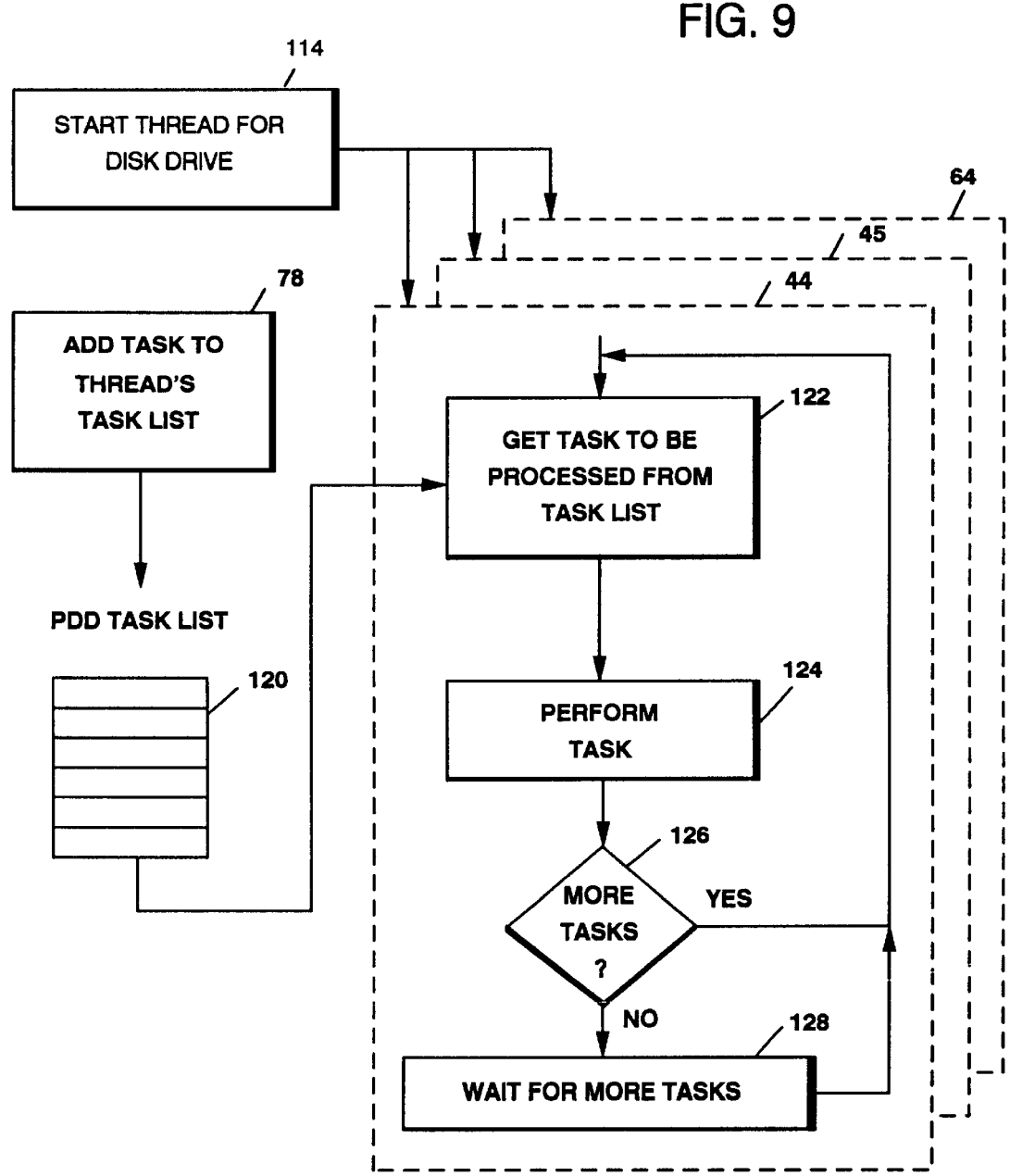
FIG. 9 illustrates the processing of tasks at each physical disk drive in accordance with the embodiment of the invention in FIG. 8.

In this dynamic embodiment of the invention, the logical operation, or processes, of FIGS. 8 and 9 replace the processes shown in FIGS. 3 and 6A or 6B. In FIG. 8, the processing of the master task list begins again with operation 70 mapping the logical partitions of the physical disk drives list into a table, or map, associating each partition with its physical disk drive. Operation or process 70 functions as previously described for FIGS. 3 and 4, except that all partitions are mapped one time. In other words, a partition does not have to be named as a parameter in a task on the master task list for the partition to be mapped to the partition map table.

After the mapping of partitions is completed, operation 110 waits for "n" tasks to arrive at the master task list. The integer "n" can be any number from one to the maximum list capacity for the number of tasks on the master task list. If n=1, the process of updating the PDD task list from the master task list will be substantially continuous meaning that as soon as a task is loaded into the master task list, it would be transferred to a PDD task list. If n=20, then 20 tasks would be loaded in the master task list before being factored and transferred to the PDD task list. When wait step 110 is satisfied, operation 76 factors tasks from the master task list to the PDD task list as previously described in reference to FIG. 5.

Decision block 112 in FIG. 8 then tests whether a thread has been started for all physical disk drives having a task in their task list. If the answer is no, operation 114 starts, or dispatches, a thread to any disk drive not already operated on by a thread. Process flow in FIG. 8 then returns to operation 110 to wait for "n" more tasks to be loaded into master task list. If the answer to decision 112 is yes, meaning all disk drives having tasks in their PDD task list already have operating threads, then process flow also returns to operation 110 to wait for another "n" tasks to be loaded into the master task list.

In FIG. 9, the operation of the thread at each physical disk drive 44, 45 and 64 for the dynamic embodiment is illustrated. Also, for ease of reference, logical operation 114 from FIG. 8 and logical operation 78 from FIG. 5 are included in FIG. 9. Operation 114 starts a thread at each physical disk drive, as described above in reference to FIG. 8. Operation 78 loads tasks into the PDD task list 120 as describe in reference to FIG. 8 and thereby FIG. 5.

Thread operation in FIG. 9 begins at process step 122 which gets, or retrieves, a task from the PDD task list 120 for PDD 44. Although only one PDD task list is shown in FIG. 9, each PDD would have its own task list as discussed above. After a task is retrieved from the PDD task list, operation 124 performs the task. Decision block 126 then tests whether there are more tasks in the PDD task list. If there are more tasks, the process flows back to operation 122 to get the next task. If the PDD task list for PDD 44 is empty, the thread in PDD 44 waits at operation 128 for more tasks to be loaded into PDD task list for PDD 44.

Although the invention has been described with reference to various preferred embodiments and with a certain degree of particularity, it is understood that the present disclosure has been made only by way of example and that numerous changes in the details of operation and the combination and arrangement of parts or steps may be made without departing from the spirit and the scope of the invention as hereinafter claimed.

What is claimed is:

1. A method of optimizing data access in a computer system wherein said computer system includes multiple physical disks with each physical disk having an access controller, at least one of the physical disks includes a plurality of logical partitions, and a data access program for performing data access tasks on a master task list, each data access task identifying a partition on which the access task operates, said program having a plurality of program threads for concurrently accessing data located in multiple partitions, said method comprising the steps of:

mapping according to physical disks the logical partitions identified by data access tasks to be performed by the data access program;

dividing out data access tasks on the master task list by partition and physical disk into a task list for each physical disk according to the partition identified by each data access task;

initiating a thread to operate on each physical disk to be accessed as a part of the data access program; and concurrently executing said threads in accordance with each of the physical disk task lists to execute all data access tasks in each partition and access the partitions sequentially until said data access program is completed.

2. The method of claim 1 wherein said mapping step comprises the steps of: getting the partitions identified from the data access tasks on the master task list; determining on which physical disk each partition resides:

generating a partition entry in a partition map for the computing system to cross-reference each partition to a physical disk; and determining if there are more partitions to be mapped and, if so, reiterating these mapping steps until all partitions have been mapped according to their associated physical disk drive.

3. The method of claim 1 wherein said [factoring] dividing out step comprises the steps of:

getting a data access task from the master task list;

adding the data access task to said task list of the physical disk containing the partition identified by the data access task;

determining if there are more data access tasks to be divided out and, if so, reiterating these dividing out steps until all tasks have been divided out to their associated physical disk drive data access task list.

4. The method of claim 1, wherein said concurrently executing step comprises the following steps executed at each physical disk:

getting all data access tasks associated with one of the partitions from the physical disk task list;

processing all data access tasks associated with said one partition; and determining if there are more partitions having data access tasks to be processed and, if so, reiterating the data access task getting and data access task processing steps until all data access tasks in each partition have been processed sequentially by partition.

5. The method of claim 1 wherein said dividing out step comprises the steps of:

getting a data access task from the master task list;

adding the data access task to said task list of the physical disk containing the partition identified by the access task;

queuing the data access task in the physical disk task list according to partition identified by the data access task; and determining if there are more data access tasks to be divided out and, if so, reiterating the dividing out steps until all data access tasks have been queued by partition in their associated physical disk drive task list.

6. The method of claim 5, wherein said concurrently executing step comprises the following steps executed at each physical disk:

getting a data access task from the physical disk task list;

processing the data access task; and determining if there are more data access tasks to be processed and, if so, reiterating the data access task getting and data access task processing steps to sequentially get and process each data access task according to the data access tasks position in the queue until all data access tasks have been processed sequentially.

7. The method of claim 1, wherein said concurrently executing step further comprises:

ending the thread at each physical disk drive when all data access tasks in the physical disk drive's task list have been executed; and ending the data access program when all threads have ended.

8. The method of claim 1, said thread initiating step comprises the steps of:

testing whether a thread has been initiated at each physical disk drive having a task list containing at least one data access task; and starting a thread at each physical disk drive having a task list containing at least one data access task if a thread has not been previously started at the physical disk drive.

9. The method of claim 1 and in addition:

waiting for "n" data access tasks to be loaded into the master task list before proceeding to said dividing out step, where n is an integer greater than zero and no more than the maximum list capacity of the master task list.

10. The method of claim 9, wherein said concurrently executing step comprises the following steps executed at each physical disk:

getting a data access task from the physical disk task list;

processing the data access task; and determining if there are more data access tasks to be processed and, if so, reiterating the data access task getting and data access task processing steps to sequentially get and process each data access task according to the data access tasks position in the physical disk task list until all data access tasks have been processed sequentially, and if not, waiting for more data access tasks to be added to the physical disk task list before reiterating the data access task getting and data access task processing steps.

11. A method for managing read/write access to physical disk drives by multiple threads in a network system of client and server computing systems where at least some of the systems in the network have one or more physical disk drives, each disk drive has one or more logical partitions, and the server has a master task list of data access tasks to be processed and each data access task identifies with a partition to be accessed during the performance of the data access task, the method comprising the steps of:

mapping the logical partitions to a partition map for all physical disk drives in the network system;

queuing the data access tasks for each disk drive in a drive task list according to the logical partitions identified by data access tasks;

dispatching one thread to each physical disk drive to process data access tasks in the drive task list; and each thread at each disk drive executing data access tasks according to the queue of data access tasks in the task list for the disk drive whereby all data access tasks in a partition are executed by the thread prior to the thread executing data access tasks in another partition on the same disk drive.

12. The method of claim 11 and in addition the step of:

executing threads for different disk drives concurrently.

13. In an interconnected network of client and server computing systems where at least some of the systems in the network have one or more physical disk drives with a read/write access mechanism for the physical disk, each disk drive has one or more logical partitions, and the server has a master task list of read/write access tasks to be processed and each read/write access task identifies a partition to be accessed during the read/write access task, apparatus for managing accesses to physical disk drives, said apparatus comprising:

means for mapping the logical partitions to a partition map referencing the partitions to the physical disk drives in the network;

means for dividing out, based on the partition map, the read/write access tasks from the master task list to a task list for each physical disk drive according to the partitions identified by read/write access tasks;

thread means for executing read/write access tasks at each physical disk drive according to the task list for the physical disk drive, said thread means executing all tasks in one partition before executing read/write access tasks in the next partition whereby the read/write access mechanism of the physical disk drive does not cycle back and forth between partitions; and means for starting said thread means at each physical disk drive to process read/write access tasks in the drive's task list.

14. The apparatus of claim 13 wherein said mapping means comprises:

means for getting the partitions identified in the read/write access tasks on the master task list; and means for determining on which physical disk each partition resides and generating for each partition a partition entry in a partition map for the computing system to crossreference each partition to a physical disk.

15. The apparatus of claim 13 wherein said dividing out means comprises:

means for retrieving each read/write access task from the master task list; and means for adding each retrieved read/write access task to the task list of the physical disk containing the partition identified by the read/write access task.

16. The apparatus of claim 13, wherein said thread means comprises:

means for retrieving all read/write access tasks associated with one of the partitions from the physical disk task list;

means for processing all read/write access tasks associated with said one partition; and determining if there are more partitions having read/write access tasks to be processed and, if so, retrieving and processing all read/write access tasks in the next partition until all read/write access tasks in each partition have been processed.

17. The apparatus of claim 13 wherein said dividing out means comprises:

means for retrieving a read/write access task from the master task list;

means for queuing the retrieved read/write access task in one of the physical disk task lists according to the partition identified by the read/write access task and based on the partition map; and means for determining if there are more read/write access tasks to be factored and, if so, said retrieving means and said queuing means retrieving and queuing the next read/write access task until all read/write access tasks in the master task list have been queued by partition in one of the physical disk drive task lists.

18. The apparatus of claim 13, wherein said thread means comprises:

means for getting a read/write access task from the physical disk task list;

means for processing the read/write access task retrieved by said getting means; and means for determining if there are more read/write access tasks to be processed and, if so, said read/write access task getting means and said read/write access task processing means sequentially get and process each read/write access task according to the read/write access task's position in the said physical disk task list until all read/write access tasks have been processed sequentially.

19. The apparatus of claim 13, wherein said starting means comprises:

means for testing whether a thread means has been started at each physical disk having a task list containing at least one read/write access task; and said starting means starting a thread means at each physical disk having a task list containing at least one read/write access task and no thread means previously started.

20. The apparatus of claim 19 and in addition:

means for waiting for "n" read/write access tasks to be loaded into the master task list, where n is an integer greater than zero and no more than the maximum list capacity of the master task list; and said means responsive to said waiting means for dividing out read/write access tasks from the master task list to the physical disk drive task lists after "n" tasks have been loaded into the master task list.

* * * * *